US008527666B2

United States Patent
Brownlow et al.

(10) Patent No.: US 8,527,666 B2
(45) Date of Patent: Sep. 3, 2013

(54) ACCESSING A CONFIGURATION SPACE OF A VIRTUAL FUNCTION

(75) Inventors: Sean T. Brownlow, Rochester, MN (US); John R. Oberly, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 13/014,010

(22) Filed: Feb. 21, 2011

(65) Prior Publication Data

US 2012/0215941 A1    Aug. 23, 2012

(51) Int. Cl.
G06F 3/00       (2006.01)
G06F 13/12      (2006.01)

(52) U.S. Cl.
USPC ............. 710/3; 710/8; 710/6; 710/10; 710/62

(58) Field of Classification Search
None
See application file for complete search history.

(56) References Cited

U.S. PATENT DOCUMENTS

| 2009/0248937 | A1  | 10/2009 | Solomon et al. |
| 2009/0276773 | A1  | 11/2009 | Brown et al. |
| 2009/0276775 | A1* | 11/2009 | Brown et al. ............... 718/100 |
| 2009/0313391 | A1  | 12/2009 | Watanabe |
| 2010/0014526 | A1  | 1/2010  | Chavan et al. |
| 2010/0082874 | A1  | 4/2010  | Baba et al. |
| 2010/0095310 | A1  | 4/2010  | Oshins |
| 2010/0180274 | A1  | 7/2010  | Cherian et al. |

* cited by examiner

Primary Examiner — Idriss N Alrobaye
Assistant Examiner — David Martinez
(74) Attorney, Agent, or Firm — Toler Law Group

(57) ABSTRACT

A computer implemented method includes receiving a request to access a configuration space that is associated with a virtual function. The request may include a configuration space address and a root complex identifier. The computer implemented method may include identifying a root complex based on the root complex identifier. The computer implemented method may also include selecting a slot that is associated with the root complex. The slot may be capable of coupling a hardware input/output adapter to the root complex. The computer implemented method may further include determining whether the configuration space address is associated with the selected slot. The computer implemented method may include accessing the configuration space using an access mechanism in response to determining that the configuration space address is associated with the selected slot.

20 Claims, 10 Drawing Sheets

ACCESSING A CONFIGURATION SPACE OF A VIRTUAL FUNCTION

I. FIELD OF THE DISCLOSURE

The present disclosure relates generally to computer systems, and more particularly, to managing virtual functions that are hosted by a virtualized input/output (I/O) adapter.

II. BACKGROUND

A logically-partitioned computer system may include a virtualized hardware input/output (I/O) adapter. The virtualized hardware I/O adapter may be configured to provide multiple virtual functions to multiple logical partitions. Each virtual function that is hosted by the virtualized hardware I/O adapter may have an associated configuration space to enable configuring various parameters of the virtual function.

SUMMARY

In a particular embodiment, a computer implemented method includes receiving a request to access a configuration space that is associated with a virtual function. The request may include a configuration space address and a root complex identifier. The computer implemented method may include identifying a root complex based on the root complex identifier. The computer implemented method may also include selecting a slot that is associated with the root complex. The slot may be capable of coupling a hardware input/output adapter to the root complex. The computer implemented method may further include determining whether the configuration space address is associated with the selected slot. The computer implemented method may include accessing the configuration space using an access mechanism in response to determining that the configuration space address is associated with the selected slot.

In another particular embodiment, an apparatus includes a processor and a memory to store program code. The program code may be executable by the processor to receive a request to access a configuration space that is associated with a virtual function. The request may include a configuration space address and a root complex identifier. The program code may be executable by the processor to identify a root complex based on the root complex identifier. The program code may be further executable by the processor to select a slot that is associated with the root complex. The slot may be capable of coupling a hardware input/output adapter to the root complex. The program code may be executable by the processor to determine whether the configuration space address is associated with the selected slot. The program code may be further executable by the processor to access the configuration space using an access mechanism in response to determining that the configuration space address is associated with the selected slot.

In another particular embodiment, a computer program product includes a non-transitory computer usable medium having computer usable program code embodied therewith. The computer usable program code may be executable by a processor to receive a request to provision a virtual function of a hardware input/output adapter that is capable of hosting multiple virtual functions. The computer usable program code may be executable by the processor to provision the virtual function at the hardware input/output adapter. The computer usable program code may be further executable by the processor to identify a configuration space address to access a configuration space that is associated with the virtual function. The computer usable program code may be executable by the processor to associate a device identifier of the virtual function with the configuration space address of the virtual function. The computer usable program code may also be executable by the processor to associate a vendor identifier of the virtual function with the configuration space address of the virtual function. The computer usable program code may be executable by the processor to send a response to the configuration request, the response including the configuration space address that is associated with the virtual function.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

III. BRIEF DESCRIPTION OF THE DRAWINGS

IV. DETAILED DESCRIPTION

Figure 1:
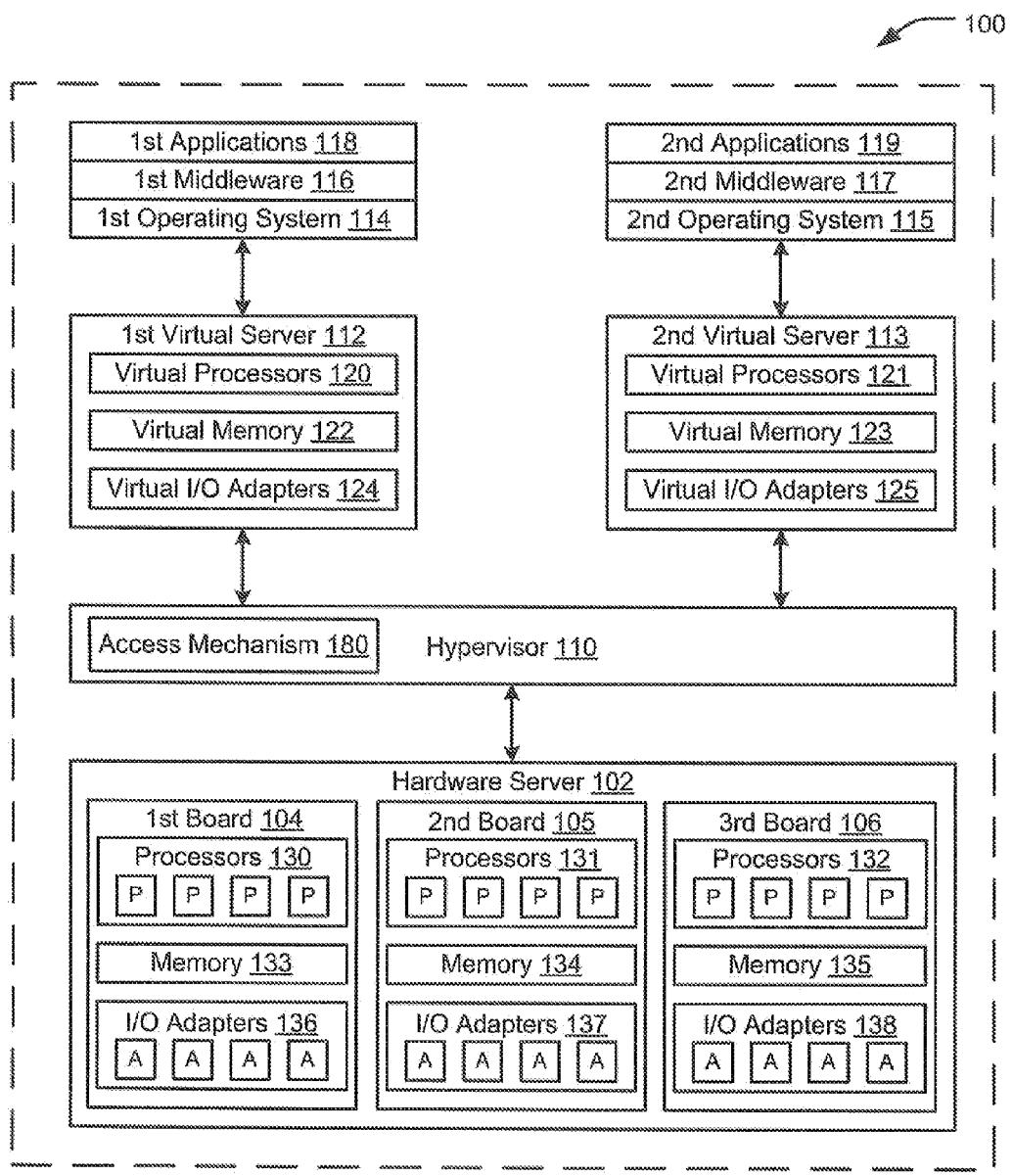
FIG. 1 is a block diagram of a first embodiment of a system to access a configuration space of a virtual function.

In a virtualized computer system, a hardware input/output (I/O) adapter may be capable of providing virtual functions to multiple logical partitions. For example, the hardware I/O adapter may be a single root input/output virtualized (SR-IOV) adapter or a multiple root input/output virtualized (MR-IOV) adapter. A hypervisor may manage the execution of the multiple logical partitions and assign one or more of the virtual functions to particular logical partitions to enable the logical partitions to perform I/O operations.

Each virtual function may have an associated configuration space that is located at a memory of the hardware I/O adapter. The configuration space may include a read-only portion and a read-write portion. For example, the read-only portion may provide information associated with the virtual function, such as a device identifier and a vendor identifier, and information associated with the hardware I/O adapter, such as a number of ports of the hardware I/O adapter and an arrangement of the ports. The read-write portion may include parameters that can be configured (e.g., by a logical partition or by an application executing in the logical partition), such as enabling/disabling memory-mapped I/O (MMIO), enabling/disabling direct memory access (DMA), setting a maximum link speed, enabling/disabling advanced error handling, setting another virtual function parameter or any combination thereof. In a particular embodiment, the configuration space may include one or more registers, such as read-only registers and read-write registers.

The hypervisor may provide an access mechanism to enable a logical partition to access the configuration space that is associated with the virtual function that is assigned to the logical partition. The access mechanism provided by the hypervisor may be a high-level access mechanism that uses lower-level access mechanisms to access the configuration space of each virtual function. For example, the access mechanism provided by the hypervisor may call a configuration space access mechanism of a root complex, an adapter provided configuration mechanism, another access mechanism, or any combination thereof.

Specifications for hardware I/O adapters, such as the SR-IOV and MR-IOV specifications, may be modified as the specifications are updated. In addition, the specifications may be vague as to how certain features implemented. Thus, a particular hardware I/O adapter may be incompatible with a configuration space access mechanism that is provided by a root complex. If the particular hardware I/O adapter provides an adapter specific access mechanism, the hypervisor may call the adapter specific access mechanism to access the configuration space of each virtual function. To address situations where the particular hardware I/O adapter is incompatible with the configuration space access mechanism of the root complex and the particular hardware I/O adapter does not provide an adapter specific access mechanism, the hypervisor may create and maintain information associated with the virtual functions. For example, the hypervisor may create and maintain a table for each hardware I/O adapter. Each table may be created in a local memory that is accessible to the hypervisor. Each table may include a configuration space address to access the configuration space associated with each virtual function. Each table may include additional information, such as a vendor identifier, a device identifier, and a token, that is associated with each virtual function.

Thus, the hypervisor may enable access to the configuration space associated with each virtual function. The hypervisor may use a configuration space access mechanism provided by a root complex if the provided access mechanism is capable of accessing (e.g., compatible with) the hardware I/O adapter that is hosting the virtual function. If the hardware I/O adapter provides an access mechanism, the hypervisor may use the adapter provided access mechanism to access the configuration space of the virtual function. The hypervisor may create and maintain data (e.g., in a table) that includes a configuration space address of the virtual function. The data that the hypervisor stores in the table may include at least some of the information that is provided in the read-only portion of the configuration space. The hypervisor may thus provide access to the configuration space of a virtual function if the configuration space access mechanism provided by a root complex is incompatible with the hardware I/O adapter.

Referring to FIG. 1, a block diagram of a first embodiment of a system to provide virtual functions that are hosted by an input/output adapter is depicted and generally designated 100. The system 100 may include a hardware server 102 that is managed by a hypervisor 110. The hardware server 102 may include hardware resources, such as a first board 104, a second board 105, and a third board 106. While three boards are illustrated in FIG. 1, the number of boards may be increased or decreased based on processing considerations. The boards 104-106 may include processors 130-132, memory 133-135, and input/output (I/O) adapters 136-138. Each of the boards 104-106 may include additional hardware resources (not shown), such as specialized processors (e.g., digital signal processors, graphics processors, etc.), disk drivers, other types of hardware, or any combination thereof. The processors 130-132, the memory 133-135, and the I/O adapters 136-138 of the hardware server 102 may be managed by hypervisor 110. Each processor of the processors 130-132 may be a simultaneous multithreading (SMT)-capable processor that is capable of concurrently executing multiple different threads.

The hypervisor 110 may create and manage logical partitions, such as virtual servers 112, 113. A logical partition may be a subset of the resources of the hardware server 102 that is virtualized as a separate virtual server. Each of the virtual servers 112, 113 may have its own set of virtual resources, similar to a physical server. For example, the first virtual server 112 may include virtual processors 120, virtual memory 122, and virtual I/O adapters 124. Virtual server 113 may include virtual processors 121, virtual memory 123, and virtual I/O adapters 125. The hypervisor 110 may map the hardware of the hardware server 102 to the virtual servers 112, 113. For example, the processors 130-132 may be mapped to the virtual processors 120, 121; the memory 133-135 may be mapped to the virtual memory 122, 123, and the I/O adapters 136-138 may be mapped to the virtual I/O adapters 124-125. The hypervisor 110 may manage the selection of portions of the hardware server 102 and their temporary assignment to portions of the virtual servers 112, 113.

The hypervisor 110 may provide an access mechanism 180 to enable the virtual servers (e.g., the virtual servers 112 and 113) to access configuration space associated with each virtual I/O adapter (e.g., the virtual I/O adapters 124 and 125).

Figure 2:
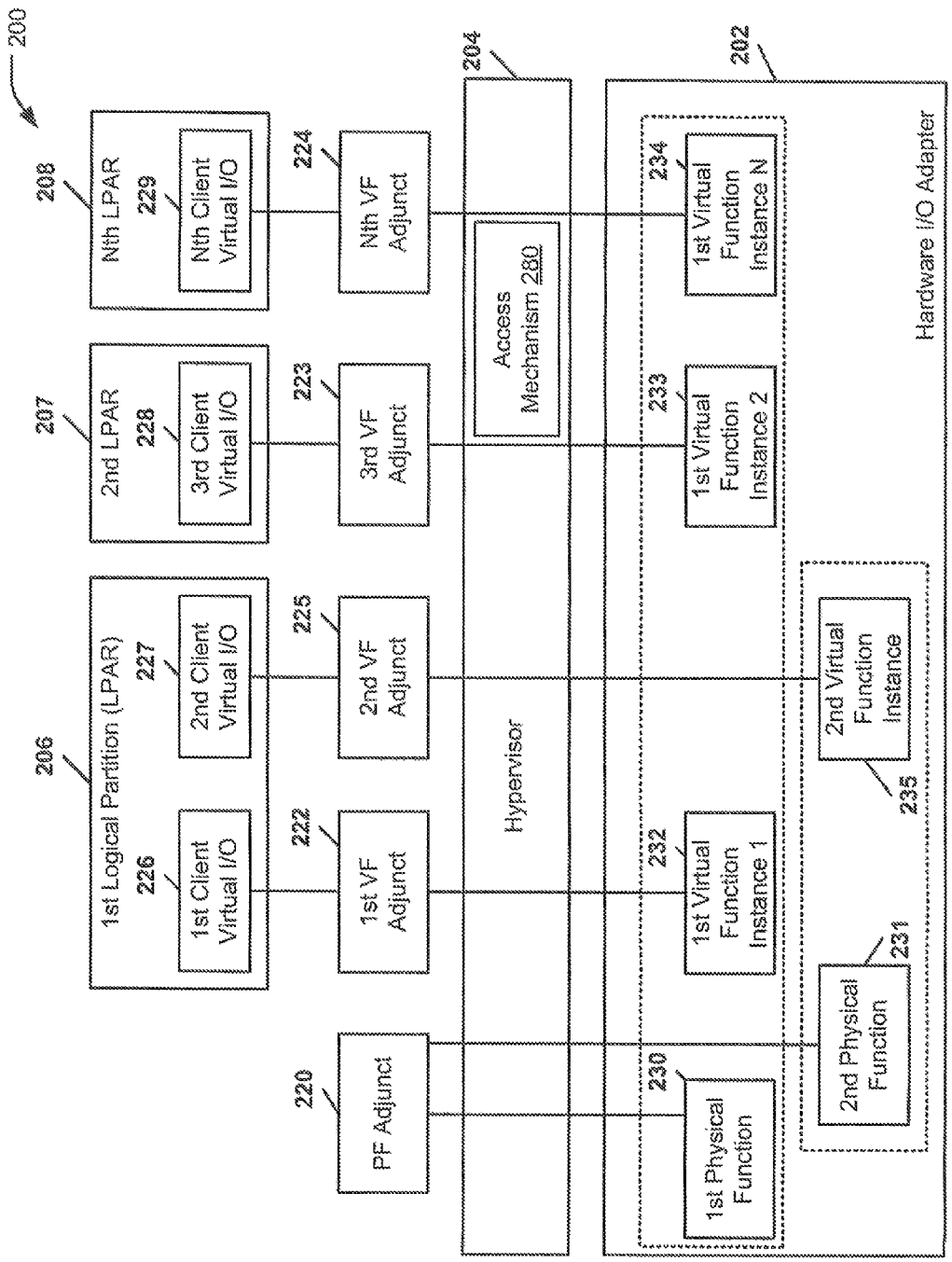
FIG. 2 is a block diagram of a second embodiment of a system to access a configuration space of a virtual function.

Referring to FIG. 2, a block diagram of a second embodiment of a system to provide virtual functions that are hosted by an input/output adapter is depicted and generally designated 200. In the system 200, a hypervisor 204 may enable multiple logical partitions to access virtual functions provided by hardware that includes a hardware I/O adapter 202. For example, the hypervisor 204 may enable a first logical partition 206, a second logical partition 207, and an Nth logical partition 208, to access virtual functions 232-235 that are provided by the hardware I/O adapter 202. To illustrate, the hypervisor 204 may use a first physical function 230 of the hardware I/O adapter 202 to provide a first instance of a first virtual function 232, a second instance of a first virtual function 233, and an Nth instance of a first virtual function 234 to the logical partitions 206-208. The hypervisor 204 may use a second physical function 231 of the hardware I/O adapter 202 to provide a second virtual function 235 to the logical partitions 206-208.

The physical functions 230, 231 may include peripheral component interconnect (PCI) functions that support single root I/O virtualization capabilities (SR-IOV). Each of the virtual functions 232-235 may be associated with one of the physical functions 230, 231 and may share one or more physical resources of the hardware I/O adapter 202.

Software modules, such as a physical function (PF) adjunct 220 and virtual function (VF) adjuncts 222-225, may assist the hypervisor in managing the physical functions 230, 231 and the virtual functions 232-235. For example, a user may specify a particular configuration and the PF manager 220 may configure the virtual functions 232-235 from the physical functions 230, 231 accordingly. The VF adjuncts 222-225 may function as virtual device drivers. For example, just as a device driver for a physical device may enable a client application to access the functions of the device, each of the VF adjuncts 222-225 may enable a client application to access the virtual functions 232-235. In the system 200, the VF adjuncts 222 and 224-225 may enable access to the first virtual function instances 232 and 234-235, and the second VF adjunct 225 may enable access to the second virtual function 235.

In operation, the PF manager 220 may enable the first virtual function instances 232-234 from the first physical function 230. The PF manager 220 may enable the second virtual function 235 from the second physical function 231. The virtual functions 232-235 may be enabled based on a user provided configuration. Each of the logical partitions 206-208 may execute an operating system (not shown) and client applications (not shown). The client applications that execute at the logical partitions 206-208 may perform virtual input/output operations. For example, a first client application executing at the first logical partition 206 may include first client virtual I/O 226, and a second client application executing at the first logical partition 206 may include a second client virtual I/O 227. The first client virtual I/O 226 may access the first instance of the first virtual function 232 via the first VF adjunct 222. The second client virtual I/O 227 may access the second virtual function 235 via the second VF adjunct 225. A third client virtual I/O 228 executing at the second logical partition 207 may access the second instance of the first virtual function 233 via the third VF adjunct 223. An Nth client virtual I/O 229 executing at the Nth logical partition 208 may access the Nth instance of the first virtual function 233 via the Nth VF adjunct 224.

The hypervisor 204 may assign the first instance of the first virtual function 232 and the first instance of the second virtual function 235 to the first logical partition 206. The hypervisor 204 may provide the first logical partition 206 with two tokens (not shown), such as a first token and a second token, to enable the first logical partition 206 to access the virtual functions 232 and 235. The token may include a group identifier that identifies a physical slot location of the hardware I/O adapter 202 that hosts the virtual functions 232 and 235. The hardware I/O adapter 202 that hosts the virtual functions 232 and 235 may be moved from a first physical slot location to a second physical slot location. After the move, the hypervisor 202 may associate the group identifier with the second physical slot location to enable the virtual functions 232 and 235 to be provided to the first logical partition 206.

It will be appreciated by one skilled in the art that the present invention is equally suited to embodiments that do not utilize a virtual function (VF) manager and client virtual I/O to enable a logical partition to access a virtual function, and instead enable a device driver within a logical partition to directly manage the virtual function.

The hypervisor 204 may provide an access mechanism 280 to enable logical partitions (e.g., the logical partitions 206-208) to access configuration space associated with each of the virtual functions 232-235.

Figure 3:
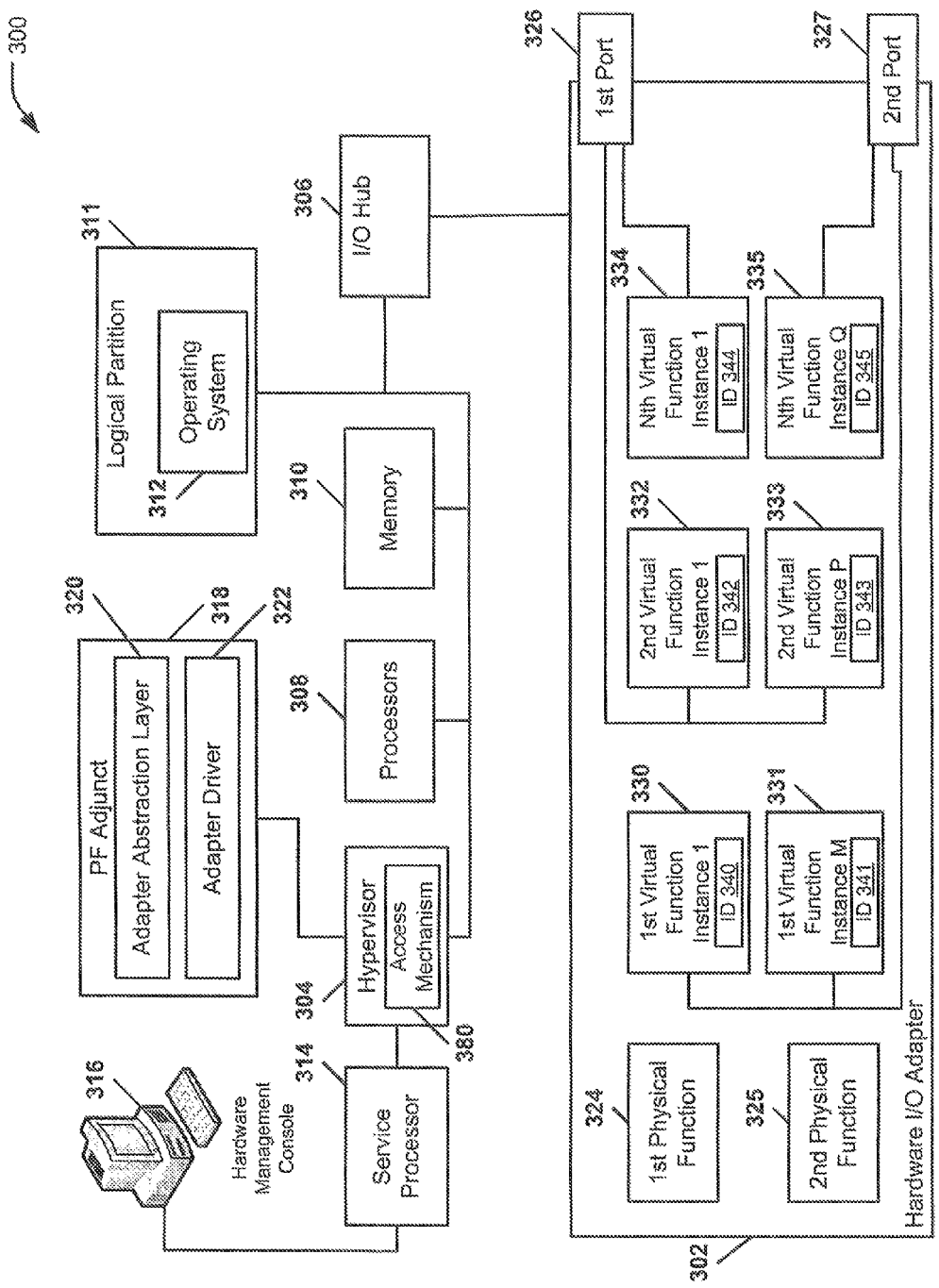
FIG. 3 is a block diagram of a third embodiment of a system to access a configuration space of a virtual function.

Referring to FIG. 3, a block diagram of a third embodiment of a system to provide virtual functions that are hosted by an input/output adapter is depicted and generally designated 300. In the system 300, a hypervisor 304 may be coupled to hardware devices, such as a hardware I/O adapter 302, an I/O hub 306, processors 308, and a memory 310. The hypervisor 304 may be coupled to a logical partition 311 that executes an operating system 312. The hypervisor 304 may enable the logical partition 311 to access virtual functions associated with the hardware I/O adapter 302. A physical function (PF) manager 318 may be coupled to the hypervisor 304 to manage the physical functions of the hardware I/O adapter 302. In a particular embodiment, the PF manager 318 may be in a logical partition. A hardware management console 316 may be coupled to the hypervisor 304 via a service processor 314.

The service processor 314 may be a microcontroller that is embedded in a hardware server (e.g., the hardware server 102 of FIG. 1) to enable remote monitoring and management of the hardware server via the hardware management console 316. For example, the hardware management console 316 may be used by a system administrator to specify a configuration of hardware devices, such as specifying virtual functions of the hardware I/O adapter 302. The PF manager 318 may configure virtual functions of the hardware I/O adapter 302 based on configuration information provided by a system administrator via the hardware management console 316.

The hypervisor 304 may enable hardware devices, such as the hardware I/O adapter 302, to be logically divided into virtual resources and accessed by one or more logical partitions (e.g., the N logical partitions 206-208 of FIG. 2). The I/O hub 306 may include a pool of interrupt sources 328. The hypervisor 304 may associate at least one interrupt source from the pool of interrupt sources 328 with each virtual function of the hardware I/O adapter 302.

The I/O hub 306 may be a hardware device (e.g., a microchip on a computer motherboard) that is under the control of the hypervisor 304. The I/O hub 306 may enable the hypervisor to control I/O devices, such as the hardware I/O adapter 302.

The processors 308 may include one more processors, such as central processing units (CPUs), digital signal processors (DSPs), other types of processors, or any combination thereof. One or more of the processors 308 may be configured in a symmetric multiprocessor (SMP) configuration.

The memory 310 may include various types of memory storage devices, such as random access memory (RAM) and disk storage devices. The memory 310 may be used to store and retrieve various types of data. For example, the memory 310 may be used to store and to retrieve operational instructions that are executable by one or more of the processors 308.

The operating system 312 may execute within the logical partition 311. The virtual I/O of client applications (e.g., the client virtual I/Os 226-229 of FIG. 2) that execute using the operating system 312 may access virtual functions of the hardware I/O adapter 302. The hypervisor 304 may use the I/O hub 306 to connect to and control I/O devices, such as the hardware I/O adapter 302.

The PF manager 318 may include an adapter abstraction layer 320 and an adapter driver 322. The adapter abstraction layer 320 may include a generic abstraction to enable configuration of physical functions and virtual functions of the hardware I/O adapter 302. The adapter driver 322 may be specific to each particular model of hardware adapter. The adapter driver 322 may be provided by a manufacturer of the hardware I/O adapter 302.

The hardware I/O adapter 302 may include physical functions and ports, such as a first physical function 324, a second physical function 325, a first port 326, and a second port 327. The PF manager 318 may configure virtual functions based on the physical functions 324, 325 and associate the virtual functions with one or more of the ports 326, 327 of the hardware I/O adapter 302. For example, the PF manager 318 may configure the first physical function 324 to host multiple instances of a first virtual function, such as the first instance of the first virtual function 330 and the Mth instance of the first virtual function 331, where M is greater than 1. The instances of the first virtual function 330, 331 may be associated with the second port 327. The PF manager 318 may configure the second physical function 325 to host multiple instances of a second virtual function, such as the first instance of the second virtual function 332 and the Pth instance of the second virtual function 333, where P is greater than 1. The instances of the second virtual function 332, 333 may be associated with the first port 326. The PF manager 318 may configure multiple instances of an Nth virtual function, such as the first instance of the Nth virtual function 334 and the Qth instance of the Nth virtual function 335, where N is greater than 2, and Q is greater than 1. The instances of the Nth virtual function 334, 335 may be associated with the second port 327. The instances of the Nth virtual function 334, 335 may be hosted by a physical function, such as one of the first physical function 324, the second physical function 325, and another physical function (not shown).

Each virtual function (e.g., each of the virtual functions 330-335) may have an associated virtual function identifier (ID). For example, in the system 300, the first instance of the first virtual function 330 may have an associated identifier 340, the Mth instance of the first virtual function 331 may have an associated identifier 341, the first instance of the second virtual function 332 may have an associated identifier 342, the Pth instance of the second virtual function 333 may have an associated identifier 343, the first instance of the Nth virtual function 334 may have an associated identifier 344, and the Qth instance of the Nth virtual function 335 may have an associated identifier 345.

Each virtual function identifier may uniquely identify a particular virtual function that is hosted by the hardware I/O adapter 302. For example, when a message (not shown) is routed to a particular virtual function, the message may include the identifier associated with the particular virtual function. As another example, a token 313 may be provided to the operating system 312 to enable the operating system 312 to access one of the virtual functions 330-335 at the hardware I/O adapter 302. The token 313 may include a virtual function identifier 380 that is associated with the accessed virtual function. For example, the first instance of the first virtual function 330 may be assigned to the operating system 312. The token 313 may be provided to the operating system 312 to access the first instance of the first virtual function 330. The token 313 may include the virtual function identifier 380. The virtual function identifier 380 may comprise the identifier 340 that is associated with the first instance of the first virtual function 330.

The hypervisor 304 may assign one or more of the virtual functions 330-335 to the logical partition 311. For each virtual function that is assigned to the logical partition 311, the hypervisor 304 may provide the logical partition 206 with a token (not shown) to enable the logical partition 311 to access the virtual function. The token may include a group identifier that identifies a physical slot location of the hardware I/O adapter 302 that hosts the assigned virtual functions.

The hypervisor 304 may provide an access mechanism 380 to enable logical partitions (e.g., the logical partition 311) to access configuration space associated with one or more of the virtual functions 330-335.

Figure 4:
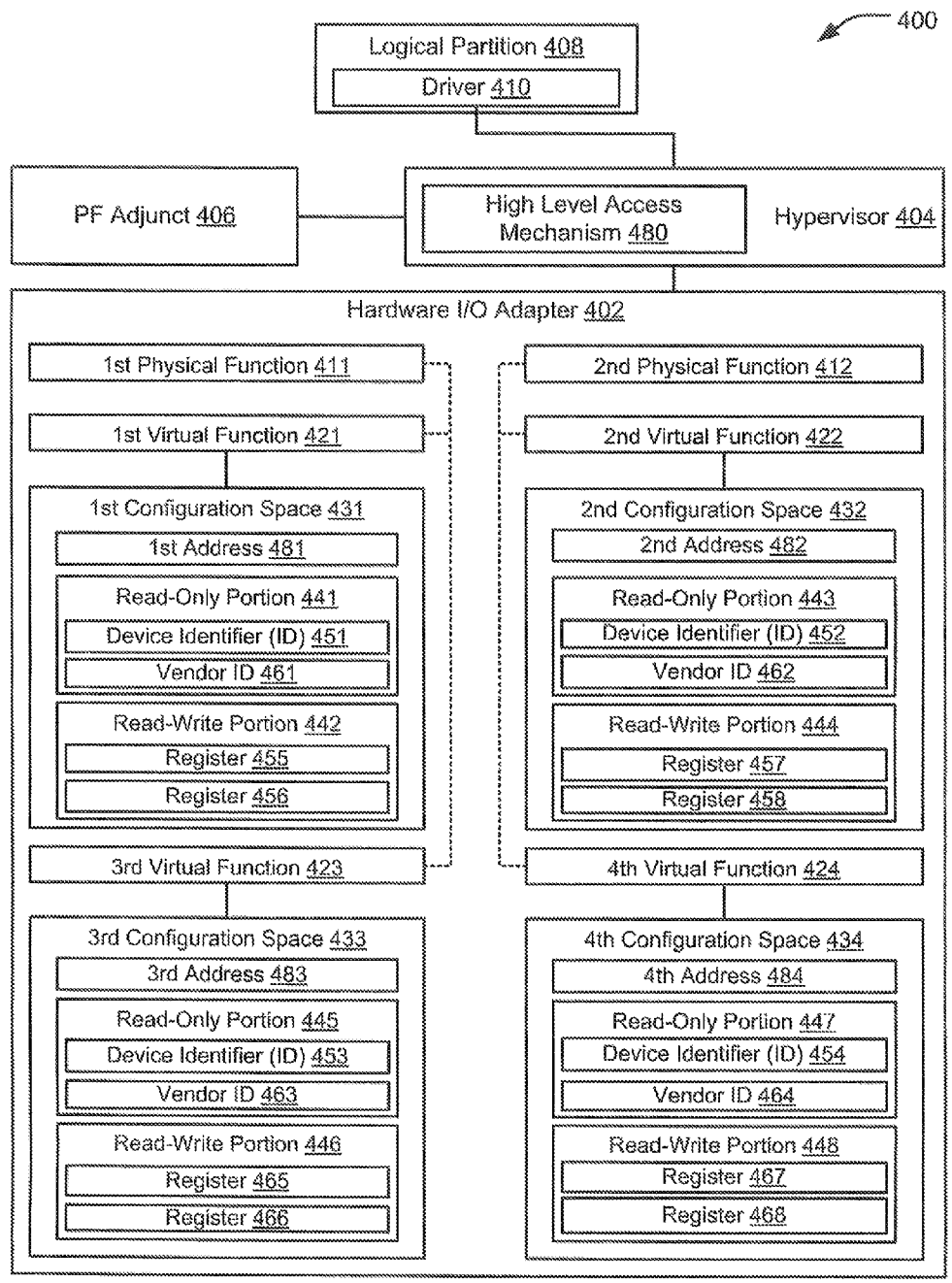
FIG. 4 is a block diagram of a fourth embodiment of a system to access a configuration space of a virtual function.

Referring to FIG. 4, a block diagram of a fourth embodiment of a system to access a configuration space of a virtual function is depicted and generally designated 400. The system 400 includes a hypervisor 404 that manages a hardware input/output (I/O) adapter 402. The hypervisor 404 may assign one or more virtual functions that are hosted by the hardware I/O adapter 402 to one or more logical partitions, such as the logical partition 408. A physical function (PF) adjunct 406 may assist the hypervisor 404 in performing various functions.

The hardware I/O adapter 402 may be capable of hosting multiple virtual functions, such as a first virtual function 121, a second virtual function 422, a third virtual function 423, and a fourth virtual function 424. The virtual functions 421-424 may be hosted by physical functions of the hardware I/O adapter 402. For example, a first physical function 411 may host the first virtual function 421 and the third virtual function 423. A second physical function 412 may host the second virtual function 422 and the fourth virtual function 424.

Each of the virtual functions 421-424 may have an associated configuration space. For example, in FIG. 4, the first virtual function 421 may have a first configuration space 431, the second virtual function 422 may have a second configuration space 432, the third virtual function 423 may have a third configuration space 433, and the fourth virtual function 424 may have a fourth configuration space 434. Each of the configuration spaces 431-434 may include an address that enables access to the particular configuration space.

Each of the configuration spaces 431-434 may include a read-only portion and a read-write portion. The read-only portion of the configuration space may include information associated with the virtual function. For example, the read-only portion of each of the configuration spaces 431-434 may include a device identifier associated with the virtual function and a vendor identifier associated with the virtual function. The read-only portion of the configuration space may include physical attributes of the hardware I/O adapter 402. For example, the vital product data may include a number of ports of the hardware I/O adapter 402, a configuration of the ports (e.g., where the ports are located) on the hardware I/O adapter 402, etc. The read-write portion of each configuration space may include parameters of each virtual function that may be modified and functions of each virtual function that may be enabled/disabled. For example, the read-write portions of each configuration space may include enabling/disabling memory mapped input output (MMIO) access, enabling/disabling direct memory access (DMA) access, setting/modifying a link speed, enabling/disabling advanced error detection, other virtual function parameters, or any combination thereof.

In the system 400, a first configuration space 431 may be associated with first virtual function 421. The first configuration space 431 may include a first address 481, a read-only portion 441, and a read-write portion 442. The first address 481 may enable the logical partition 408 to access the first configuration space 431. The read-only portion 441 may include a device identifier 451, a vendor identifier 461, vital product data (VPD), other read-only information associated with the first virtual function 421 and the hardware I/O adapter 402, or any combination thereof. The read-write portion 442 may include multiple registers, such as a register 455 and a register 456, that may be modified to enable or disable various functionality (e.g., MMIO, DMA etc.) and to configure various parameters that are associated with the first virtual function 421.

A second configuration space 432 may be associated with the second virtual function 422. The second configuration space 432 may include a second address 482 to enable access to the second configuration space 432. The second configuration space 432 may include a read-only portion 443 and a read-write portion 444. The read-only portion 443 may include read-only parameters associated with the second virtual function 422, such as a device identifier 452 and a vendor identifier 462. The read-write portion 444 may include multiple registers, such as a register 457 and a register 458, that may be modified to enable or disable various functionality (e.g., MMIO and DMA) of the second virtual function 422 and to configure various parameters that are associated with the second virtual function 422.

A third configuration space 433 may be associated with the third virtual function 423. The third configuration space 433 may include a third address 483 to enable access to the third configuration space 433. The third configuration space 433 may include a read-only portion 445 and a read-write portion 446. The read-only portion 445 may include read-only parameters associated with the third virtual function 423, such as a device identifier 453 and a vendor identifier 463. The read-write portion 446 may include multiple registers, such as a register 465 and a register 466, that may be modified to enable or disable various functionality (e.g., MMIO and DMA) of the third virtual function 423 and to configure various parameters that are associated with the third virtual function 423.

A fourth configuration space 434 may be associated with the fourth virtual functions 424. The fourth configuration space 434 may include a fourth address 484 to enable access to the fourth configuration space 434. The fourth configuration space 434 may include a read-only portion 447 and a read-write portion 448. The read-only portion 447 may include read-only parameters associated with the fourth virtual function 424, such as a device identifier 454 and a vendor identifier 464. The read-write portion 448 may include multiple registers, such as a register 467 and a register 468, that may be modified to enable or disable various functionality (e.g., MMIO and DMA) of the fourth virtual function 424 and to configure various parameters that are associated with the fourth virtual function 424.

In operation, a driver 410 in the logical partition 408 may enable an operating system or application executing in the logical partition 408 to access the configurations spaces 431-434 of the hardware I/O adapter 402. The driver 410 and the PF adjunct 406 may use a high level access mechanism 480 that is provided by the hypervisor 404 to access one or more of the configuration spaces 431-434. For example, the driver 410 and the PF adjunct 406 may use the high level access mechanism 480 to read from one or more of the read-only portions 441-447. The driver 410 and the PF adjunct 406 may use the high level access mechanism 480 to read from and write to one or more of the read-write portions 442, 444, 446, and 448.

Thus, the high level access mechanism 480 of the hypervisor 404 may enable a driver (e.g., the driver 410) and an adjunct (e.g., the PF adjunct 406) to access one or more configurations spaces (e.g., the configuration spaces 431-434) at the hardware I/O adapter 402.

Figure 5:
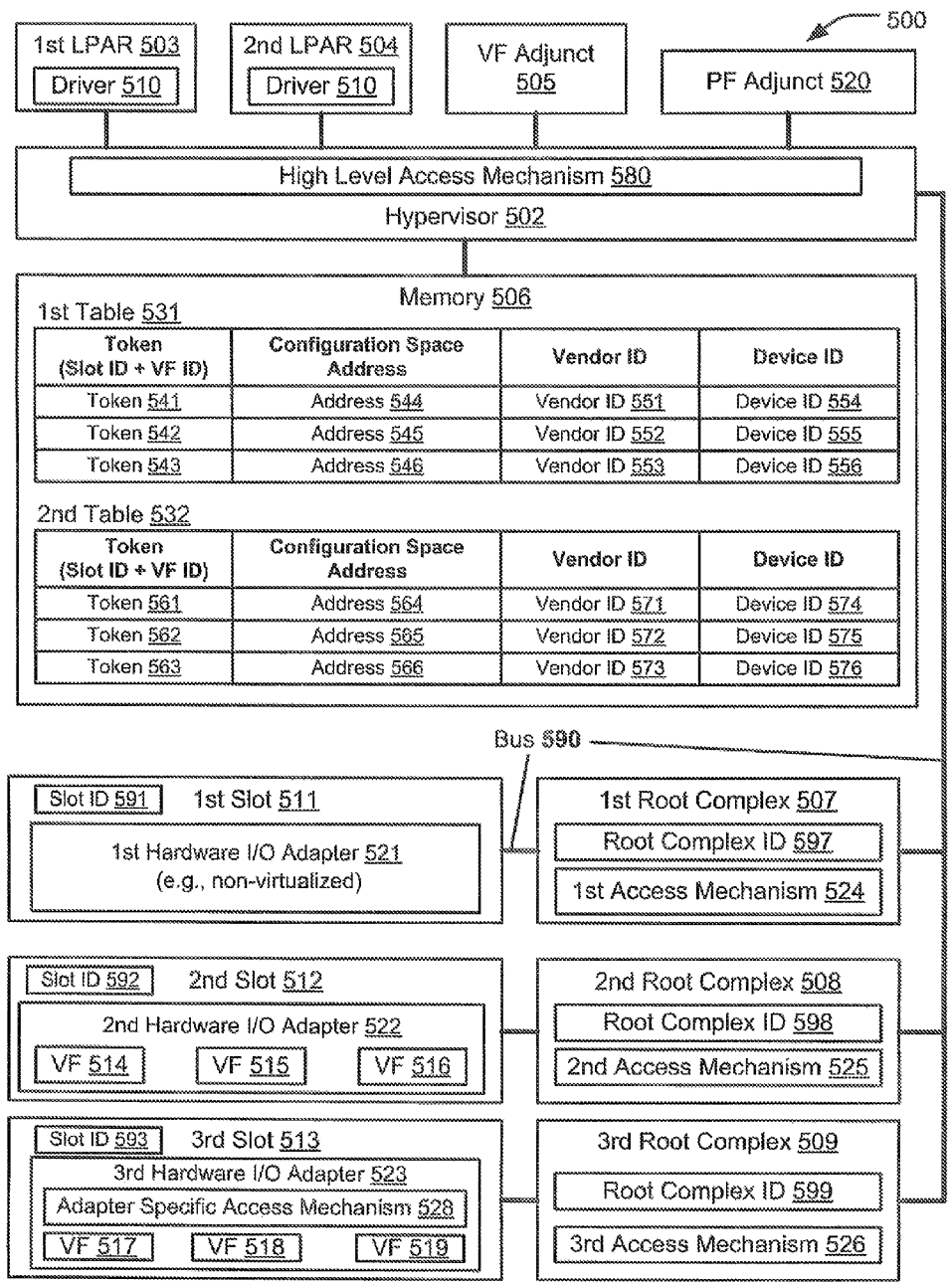
FIG. 5 is a block diagram of a fifth embodiment of a system to access a configuration space of a virtual function.

Referring to FIG. 5, a block diagram of a particular embodiment of a system to access a configuration space of a virtual function is depicted and generally designated 500. The system 500 includes a hypervisor 502 that enables multiple logical partitions, such as the first logical partition (LPAR) 503 and a second logical partition 504, to execute in the system 500. A virtual function (VF) adjunct 505 may assist the hypervisor 502 with performing various operations associated with virtual functions. A physical function (PF) adjunct 520 may assist the hypervisor 502 with performing various operations associated with physical functions and virtual functions.

The hypervisor 502 may be coupled to a memory 506 and to multiple root complexes, such as a first root complex 507, a second root complex 508, and a third root complex 509, via a bus 590. The bus 590 may include one or more types of I/O buses. For example, the bus 590 may include a peripheral component interconnect (PCI) bus, a PCI-express (PCI-e) bus, another type of I/O bus, or any combination thereof. Each of the root complexes 507-509 may provide one or more slots, such as a first slot 511, a second slot 512, and a third slot 513. Each of the slots 511-513 may be capable of coupling a hardware I/O adapter to one of the root complexes 507-509.

For example, the first slot 511 may be capable of coupling a first hardware I/O adapter 521 to the first root complex 507. The second slot 512 may be capable of coupling a second hardware I/O adapter 522 to the second root complex 508. The third slot 513 may be capable of coupling a third hardware I/O adapter 523 to the third root complex 509. Each slot may be identified with a unique identifier. For example, a slot identifier 591 may identify the first slot 511, a slot identifier 592 may identify the second slot 512, and a slot identifier 593 may identify the third slot 513. Each root complex may be identified with a unique identifier. For example, a root complex identifier 597 may identify the first root complex 507, a root complex identifier 598 may identify the second root complex 508, and a root complex identifier 599 may identify the third root complex 509.

Each of the root complexes 507-509 may provide an access mechanism to access a configuration space of their associated hardware I/O adapter. For example, the first root complex 507 may provide a first access mechanism 524 to access a configuration space of the first hardware I/O adapter 521. For example, the first access mechanism may use PCI-e commands to access the configuration space. The second root complex 508 may provide a second access mechanism 525, and the third root complex 509 may provide a third access mechanism 526. In a particular embodiment, each of the access mechanisms 524-526 may be capable of accessing configuration spaces associated with non-virtualized hardware I/O adapters (e.g., the first hardware I/O adapter 521), virtualized hardware I/O adapters (e.g., the hardware I/O adapters 522 and 523), or any combination thereof. In the system 500, the first access mechanism 524 may be capable of accessing a configuration space associated with a non-virtualized adapter, such as the first hardware I/O adapter 521. In the system 500, the second access mechanism 525 may be capable of accessing a configuration space associated non-virtualized adapters, such as the second hardware I/O adapter 522. In a particular embodiment, at least one of the access mechanisms 524-526 may be incompatible with one of the hardware I/O adapters 521-523. For example, one of the hardware I/O adapters 521-523 may be an earlier generation of hardware I/O adapter than the other hardware I/O adapter and may implement configuration access in a manner that is incompatible with at least one of the access mechanisms 524-526.

The second hardware I/O adapter 522 may provide multiple virtual functions that may be assigned to one or more of the logical partitions, such as the logical partitions 503-504. For example, the second hardware I/O adapter 522 may host multiple virtual functions, such as a virtual function 514, a virtual function 515, and a virtual function 516. The third hardware I/O adapter 523 may host multiple virtual functions, such as a virtual function 517, a virtual function 518, and a virtual function 519. One or more of the hardware I/O adapters 521-523 may provide an adapter specific access mechanism to access a configuration space of the virtual functions provided by the hardware I/O adapter. In the system 500, the third hardware I/O adapter 523 may provide an adapter specific access mechanism 528. For example, the adapter specific access mechanism 528 may be used to access configuration space at the third hardware I/O adapter 523 if the third access mechanism 526 provided by the third root complex 509 is incompatible with the third hardware I/O adapter 523.

The memory 506 may be a local memory that is accessible to the hypervisor 502. The memory 506 may include a table that is associated with each virtualized hardware I/O adapter. For example, the memory 506 may include a first table 531 that is associated with the second hardware I/O adapter 522 and a second table 532 that is associated with the third hardware I/O adapter 523. Each entry of the tables 531 and 532 may include data associated with a particular virtual function. For example, each entry may include a token, a configuration space address, a vendor identifier, and a device identifier associated with a particular virtual function. Each token may include a slot identifier (e.g., identifying a slot that is associated with the root complex) and a virtual function identifier to uniquely identify each virtual function. The token may be provided to the logical partition to enable the logical partition to access the virtual function. For example, the virtual function 514 at the second hardware I/O adapter 522 may be accessed via a token 541 that is comprised of the slot identifier 592 (e.g., that is associated with the second root complex 508) and a virtual function identifier of the virtual function 514. The address 544 may correspond to an address of a configuration space associated with the virtual function 514. In the table 531, the token 541 may be associated with a vendor identifier 551 and a device identifier 554. A token 542 may be associated with the address 545, the vendor identifier 552, and the device identifier 555 of the virtual function 515 of the second hardware I/O adapter 522. A token 553 may be associated with an address 546, a vendor identifier 553, and a device identifier 556 of the virtual function 516 of the second hardware I/O adapter 522.

The second table 532 may be associated with the third hardware I/O adapter 523. The second table 532 may include entries associated with virtual functions (e.g., the virtual functions 517-519) hosted by the third hardware I/O adapter 523. For example, the second table 532 may include an entry that includes a token 561, and address 564, a vendor identifier 571, and a device identifier 574 that are associated with the virtual function 517. The second table 532 may include a token 562, an address 565, a vendor identifier 572 and a device identifier 575 that are associated with the virtual function 518. The second table 532 may include a token 563, an address 566, a vendor identifier 573, and a device identifier 576 that are associated with the virtual function 519.

In operation, during a boot up process or an initial program load process, the PF adjunct 520 may identify one or more of the access mechanisms 524-526 to access a configuration space of a virtual function. The PF adjunct 520 may provide the information identifying the access mechanisms 524-526 to the hypervisor 502. The hypervisor 502 may provide a high level access mechanism 580 to enable access to configuration spaces of the hardware I/O adapters 521-523. The high level access mechanism 580 may access the configuration spaces via the access mechanisms 524-526.

An operating system and applications executing at each of the logical partitions 503-504 may use a driver 510 to access configuration spaces of virtual functions. The driver 510 and the VF adjunct 505 may access a configuration space of the hardware I/O adapters 521-523 via the high level access mechanism 580.

In response to receiving a request from one of the logical partitions 503-504 to provide a virtual function, the hypervisor 502 may instruct the PF adjunct 520 to provision the virtual function at one of the hardware I/O adapters 522 and 523. The PF adjunct 520 may provision the virtual function at the hardware I/O adapter. To illustrate, the first logical partition 503 may request a virtual function. In response, the PF adjunct 520 may provision the virtual function 514 at the second hardware I/O adapter 522.

The PF adjunct 520 may identify a configuration space address of a configuration space that is associated with virtual function 514. For example, in FIG. 4, the first address 481 that is associated with the first configuration space 431 of the first virtual function 421 may be identified. The PF adjunct 520 may associate a device identifier and a vendor identifier of the virtual function with the configuration space address of the virtual function. For example, the VF adjunct 505 may create an entry in the first table that includes the token 541, the address 544, the vendor identifier 551, and the device identifier 554 that are associated with the virtual function 514.

When the high level access mechanism 580 is called (e.g., by one of the driver 510 and the PF adjunct 520), the high level access mechanism 580 may receive a token that is associated with the virtual function. The high level access mechanism 580 may use the token to access one of the tables 531 and 532 to retrieve the associated configuration space address, vendor identifier, and device identifier. This may result in a faster operation than using one of the access mechanisms 524-526 because the access mechanisms 524-526 may use PCI-e bus commands to access the configuration space whereas the hypervisor 502 may determine the information by accessing the memory 506.

The high level access mechanism 580 may receive a request to access (e.g., read from or write to) a configuration space that is associated with a virtual function. The request may include a token associated with the virtual function and a configuration space address and root complex identifier. The high level mechanism 580 may identify the root complex (e.g., one of the root complexes 507-509) based on the root complex identifier. The high level access mechanism 580 may select a slot that is associated with the root complex and determine whether the requested configuration space address is associated with the selected slot. For example, in FIG. 5, the high level access mechanism 580 may determine whether the requested configuration address space is associated with one of the first slot 511, the second slot 512, and the third slot 513. If the slot includes one of the slots 511-513 includes a non-virtualized adapter, such as the first hardware I/O adapter 521, an access mechanism for a non-virtualized adapter (e.g., the first access mechanism 524) may be used to access the configuration space. If one of the hardware I/O adapters 521-523 is a virtualized I/O adapter, the high level access mechanism 580 may access a second mechanism (e.g., the second mechanism 525) for use with a virtualized I/O adapter.

If one of the hardware I/O adapters 521-523 provides an adapter specific access mechanism, the high level access mechanism 580 may use the adapter specific access mechanism to access a configuration space. For example, the high level access mechanism 580 may use the adapter specific access mechanism 528 to access a configuration space of one of the virtual functions 517-519. The high level access mechanism 580 may use the adapter specific access mechanism 528 instead of the third access mechanism 526. For example, if the third access mechanism 526 is incompatible with the third hardware I/O adapter 523, the high level access mechanism 580 may use the adapter specific access mechanism 528 instead of the third access mechanism 526.

The hypervisor 502 may determine whether the high level access mechanism 580 is reading a vendor identifier or a device identifier of the virtual function. The high level access mechanism 580 may retrieve the vendor identifier or the device identifier from one of the tables 531-532 that are in the memory 506 rather than using one of the access mechanisms 524-526 and 528. By accessing one of the tables 531 and 532, the high level access mechanism 580 may provide the vendor identifier or the device identifier faster than using one of the access mechanisms 524-526 and 528. Accessing the memory 506 may be faster than retrieving the vendor identifier and the device identifier via the access mechanisms 524-526 and 528 because the access mechanisms 524-528 may involve the use of PCI-e commands.

Thus, the PF adjunct 520 may create tables, such as the table 531 and 532, in the memory 506. Each entry in the tables may include a token, a configuration space access address, a vendor identifier, and a device identifier of a virtual function. The high level access mechanism 580 may use the tables in the memory 506 to quickly identify one or more of a configuration space address, a vendor identifier, and a device identifier without having to use one of the access mechanisms 524-526 and 528.

Figure 6:
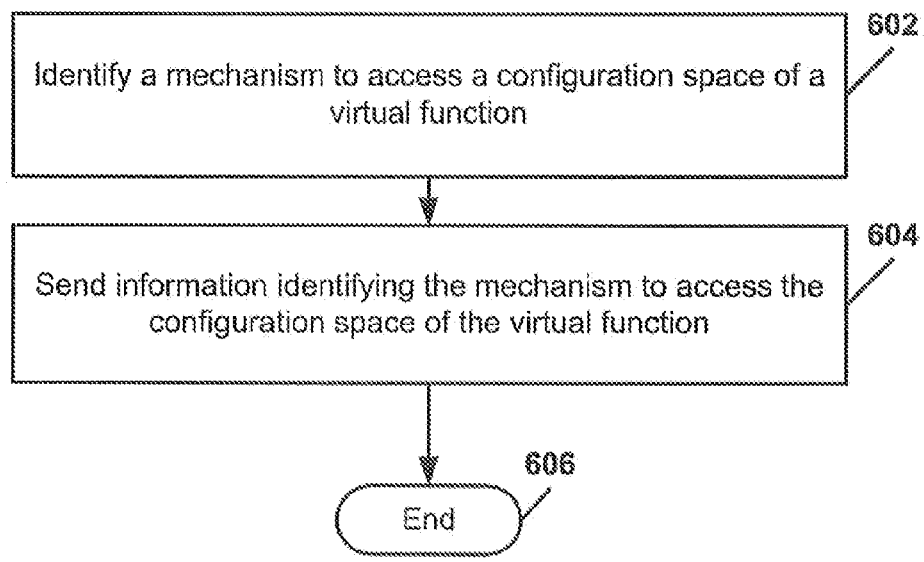
FIG. 6 is a flow diagram of a first method to access a configuration space of a virtual function.

Referring to FIG. 6, a flow diagram of a first method to access a configuration space of a virtual function is depicted. The method may be performed by a physical function (PF) adjunct, such as the PF adjunct 220 of FIG. 2, the PF adjunct 406 of FIG. 4, and the PF adjunct 520 of FIG. 5.

A mechanism to access a configuration space of a virtual function may be identified, at 602. The information identifying the mechanism to access the configuration space of the virtual function may be sent to a hypervisor, at 604. The method may end at 606. For example, in FIG. 5, during a power-up process or initial program load process, the PF adjunct 520 may identify one or more of the access mechanisms 524-526 and 528 and inform the hypervisor 504.

A hypervisor may provide a high level access mechanism to logical partitions to enable the logical partitions to access a configuration space of a virtual function. The high level access mechanism may call low level configuration space access mechanisms (e.g., the access mechanisms 524-526 and 528 of FIG. 5) to access the configuration space of the virtual function.

Figure 7:
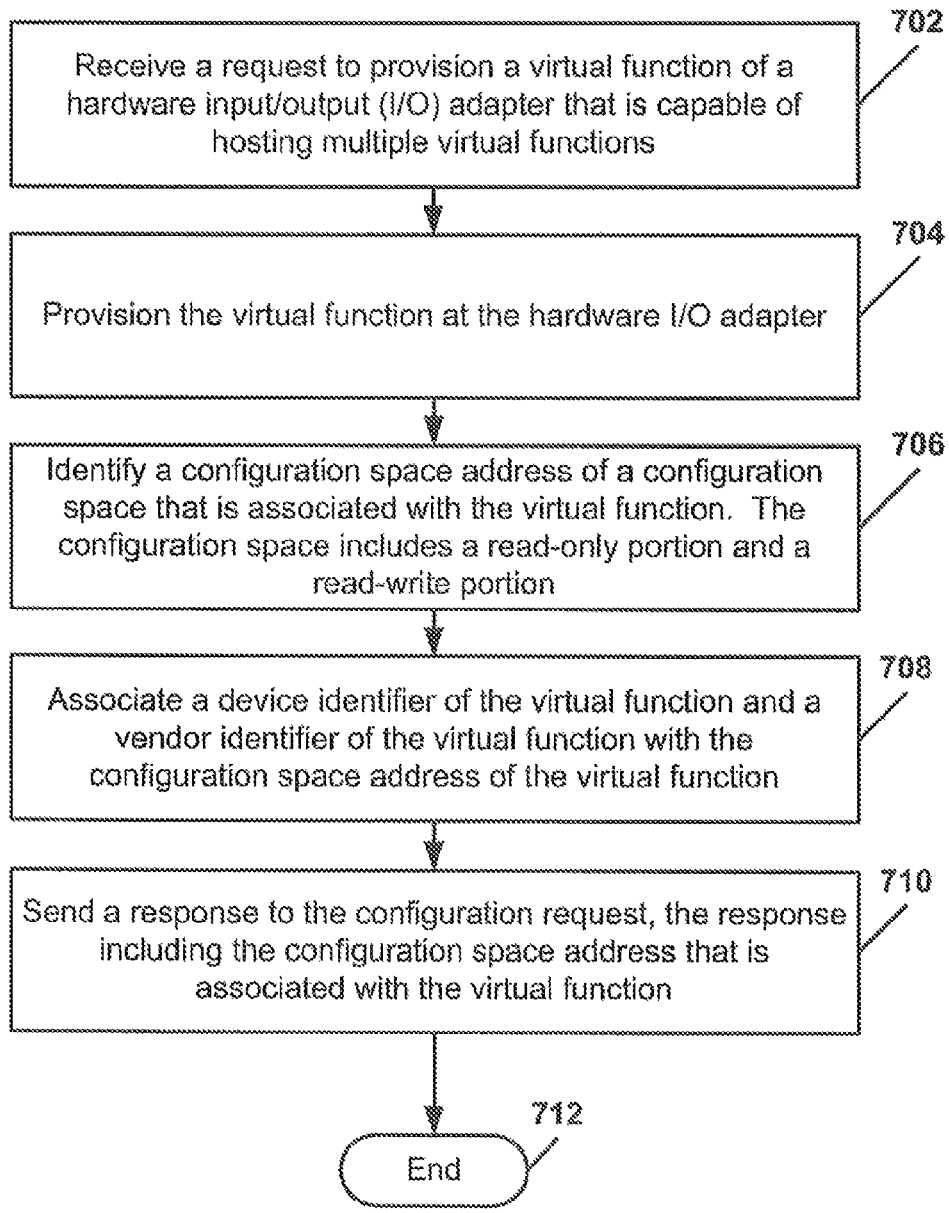
FIG. 7 is a flow diagram of a second method to access a configuration space of a virtual function.

Referring to FIG. 7, a flow diagram of a second method to access a configuration space of a virtual function is depicted. The method may be performed by a physical function (PF) adjunct, such as the PF adjunct 220 of FIG. 2, the PF adjunct 406 of FIG. 4, and the PF adjunct 520 of FIG. 5.

A request to provision a virtual function of a hardware I/O adapter may be received, at 702. Moving to 704, the virtual function may be provisioned at hardware I/O adapter. Proceeding to 706, a configuration space address of a configuration space that is associated with the virtual function may be identified. Continuing to 708, a device identifier of the virtual function and a vendor identifier of the virtual function may be associated with the configuration space address of the virtual function. For example, in FIG. 5, an entry in the tables 531-532 may be used to associate a configuration space address with the vendor identifier and the device identifier of a particular virtual function. Advancing to 710, a response to the configuration request may be sent. The response may include the configuration space address that is associated with the virtual function.

Figure 8:
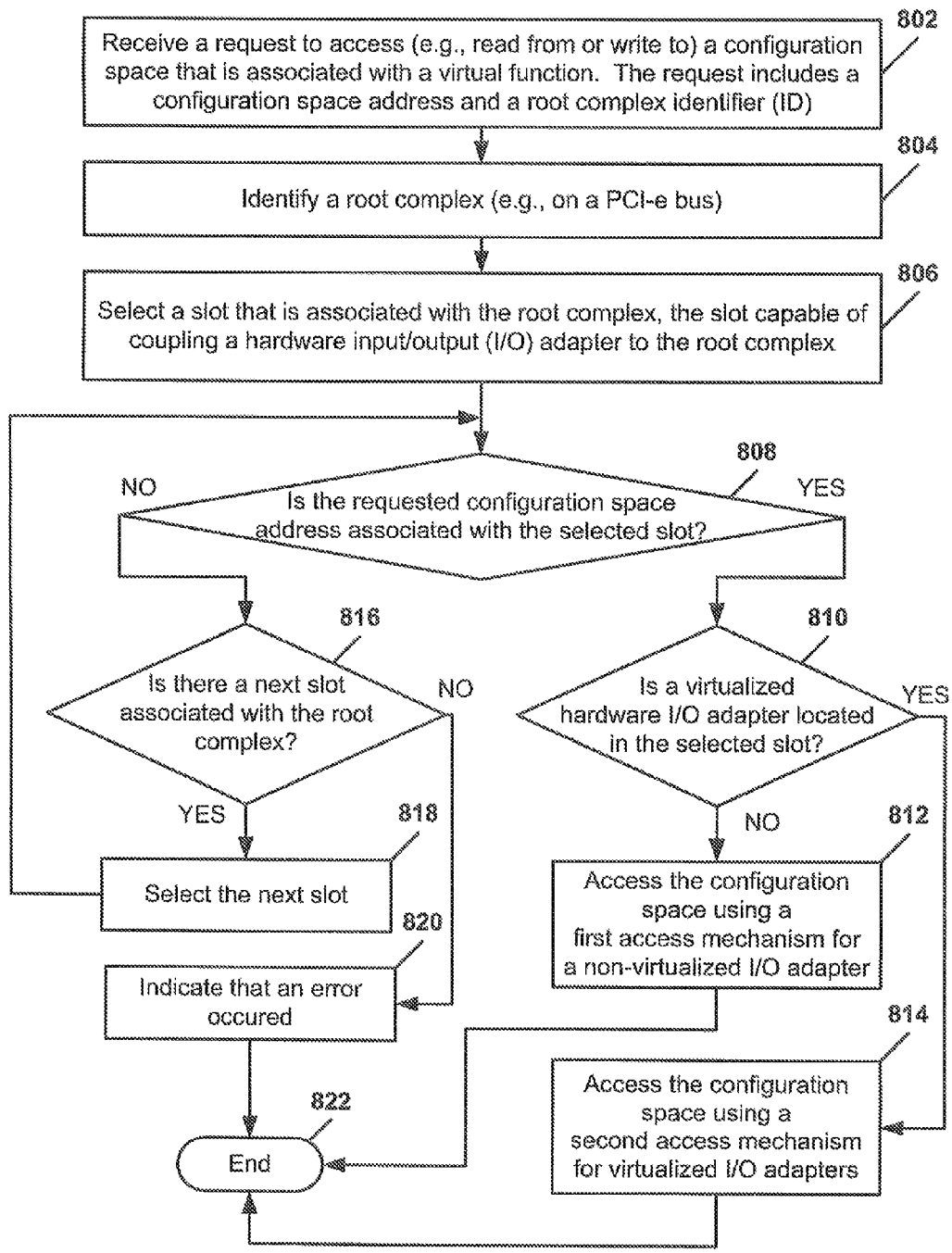
FIG. 8 is a flow diagram of a third method to access a configuration space of a virtual function.

Referring to FIG. 8, a flow diagram of a third method to access a configuration space of a virtual function is depicted. The method may be performed by a hypervisor, such as the hypervisor 110 of FIG. 1, the hypervisor 204 of FIG. 2, the hypervisor 304 of FIG. 3, the hypervisor 404 of FIG. 4, and the hypervisor 504 of FIG. 5.

A request to access (e.g., reading from or writing to) a configuration space that is associated with a virtual function may be received, at 802. The request may include a configuration space address and a root complex identifier. Moving to 804, a root complex may be identified. For example, the root complex may identified using the root complex identifier.

Proceeding to 806, a slot that is associated with the root complex may be selected. The slot may be capable of coupling a hardware I/O adapter to the root complex. Advancing to 808, a determination may be made whether the requested configuration space address is associated with selected slot. When the determination, at 808, is that the requested configuration space address is associated with selected slot, a determination may be made, at 810, whether a virtualized hardware I/O adapter is located in the selected slot. When the determination is made, at 810, that a virtualized hardware I/O adapter is located in the selected slot, the method proceeds to 812 where the configuration space is accessed using a first access mechanism for a non-virtualized I/O adapter, and the method ends at 822. If a determination is made, at 810, that a virtualized hardware I/O adapter is located in the selected slot, the method proceeds to 814 where the configuration space is accessed using a second access mechanism for virtualized I/O adapters, and the method ends at 822.

When the determination, at 808, is that the requested configuration space address is not associated with the selected slot, the method proceeds to 816 where a determination is made whether there is a next slot associated with the root complex. When a determination is made, at 816, that there is a next slot associated with the root complex, the next slot is selected, at 818, and the method proceeds to 808. When a determination is made, at 816, there is not a next slot associated with the root complex, the method proceeds to 820 where an error indication is provided and the method ends at 822.

Figure 9:
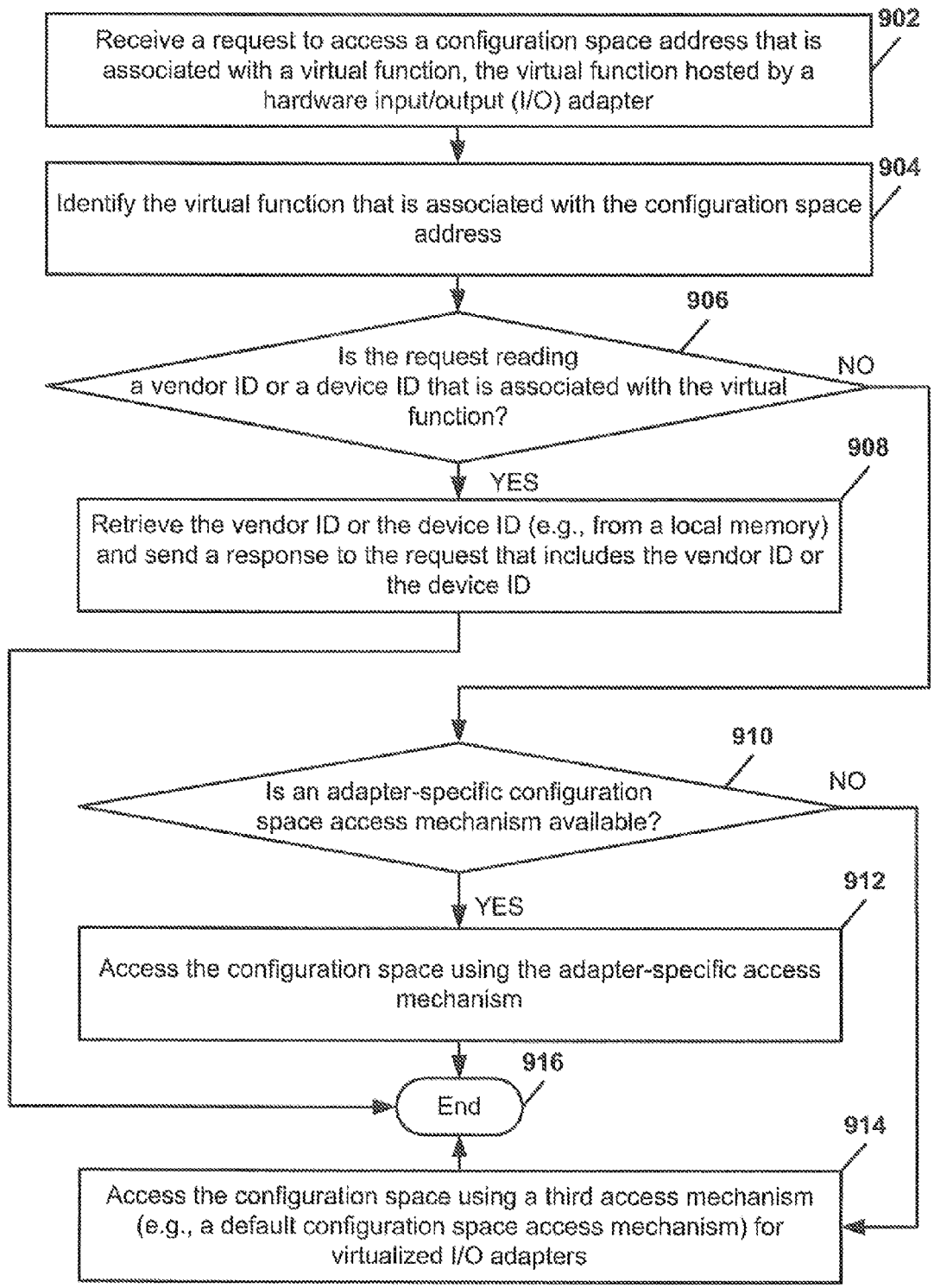
FIG. 9 is a flow diagram of a fourth method to access a configuration space of a virtual function.

Referring to FIG. 9, a flow diagram of a fourth method to access a configuration space of a virtual function is depicted. The method may be performed by a hypervisor, such as the hypervisor 110 of FIG. 1, the hypervisor 204 of FIG. 2, the hypervisor 304 of FIG. 3, the hypervisor 404 of FIG. 4, and the hypervisor 504 of FIG. 5. The method of FIG. 9 may expand on 814 of FIG. 8.

Thus, a hypervisor may provide a high level access mechanism to enable applications executing in logical partitions to access configurations spaces associated with virtual functions. The high level access mechanism may provide access to the data contained in the configuration spaces in several different ways. The hypervisor, an adjunct of the hypervisor, or a combination of both may store read-only data (e.g., such as a vendor identifier and a device identifier associated with a particular virtual function) from the configuration spaces in a locally accessible memory. Read-only data from a configuration space of a virtual function may be stored in the local memory when the virtual function is provisioned. The high level access mechanism may use an access mechanism provided by a root complex to access the configuration space of a virtual function. The high level access mechanism may use an adapter specific access mechanism provided by a hardware I/O adapter to access the configuration space of a virtual function that is hosted by the hardware I/O adapter.

Different embodiments may vary the order and the conditions under which the high level access mechanism responds to requests to access the configuration space of a virtual function. In one embodiment, the high level access mechanism may determine whether the requested data is read-only data that is available in a local memory. The high level access mechanism may retrieve the requested data from the local memory and provide the requested data to the requestor. If the requested data is not available in the local memory (e.g., because the requested data includes read-write data), the high level access mechanism may use an adapter specific mechanism if the hardware I/O adapter provides one. If an adapter specific access mechanism is not available, an access mechanism provided by the root complex may be used.

In another embodiment, if the requested data is stored in the local memory, the high level access mechanism may retrieve the requested data from the local memory and provide the requested data to the requestor. The high level access mechanism may determine if an access mechanism provided by the root complex is compatible with the hardware I/O adapter. If the access mechanism provided by the root complex is compatible with the hardware I/O adapter, the high level access mechanism may use the access mechanism of the root complex. If the access mechanism provided by the root complex is incompatible with the hardware I/O adapter, the high level access mechanism may use an adapter specific access mechanism provided by a hardware I/O adapter.

A request to access a configuration space address is associated with a virtual function is received, at 902. Moving to 904, the virtual function that is associated with the configuration space address may be identified. Proceeding to 906, a determination may be made whether the request is reading one of a vendor identifier and a device identifier that are associated with the virtual function. When a determination is made, at 906, that the request is reading one of the vendor identifier and the device identifier, the method proceeds to 908 where one of the vendor identifier and the device identifier is retrieved and a response to the request is sent that includes one of the vendor identifier and the device identifier, and the method ends at 916.

When a determination is made, at 906, that the request is not reading one of a vendor identifier and a device identifier of a virtual function, the method proceeds to 910 where a determination is made whether an adapter specific configuration space access mechanism is available. When the determination is that an adapter specific configuration space access mechanism is available, at 910, the method proceeds to access the configuration space using the adapter specific access mechanism, at 912, and the method ends at 916. When the determination, at 910 is that the adapter specific configuration space access mechanism is not available, the method proceeds to 914 where the configuration space access using a third access mechanism for virtualized I/O adapter. For example, the third access mechanism may be a default access mechanism, such as one or more PCI-e commands.

Figure 10:
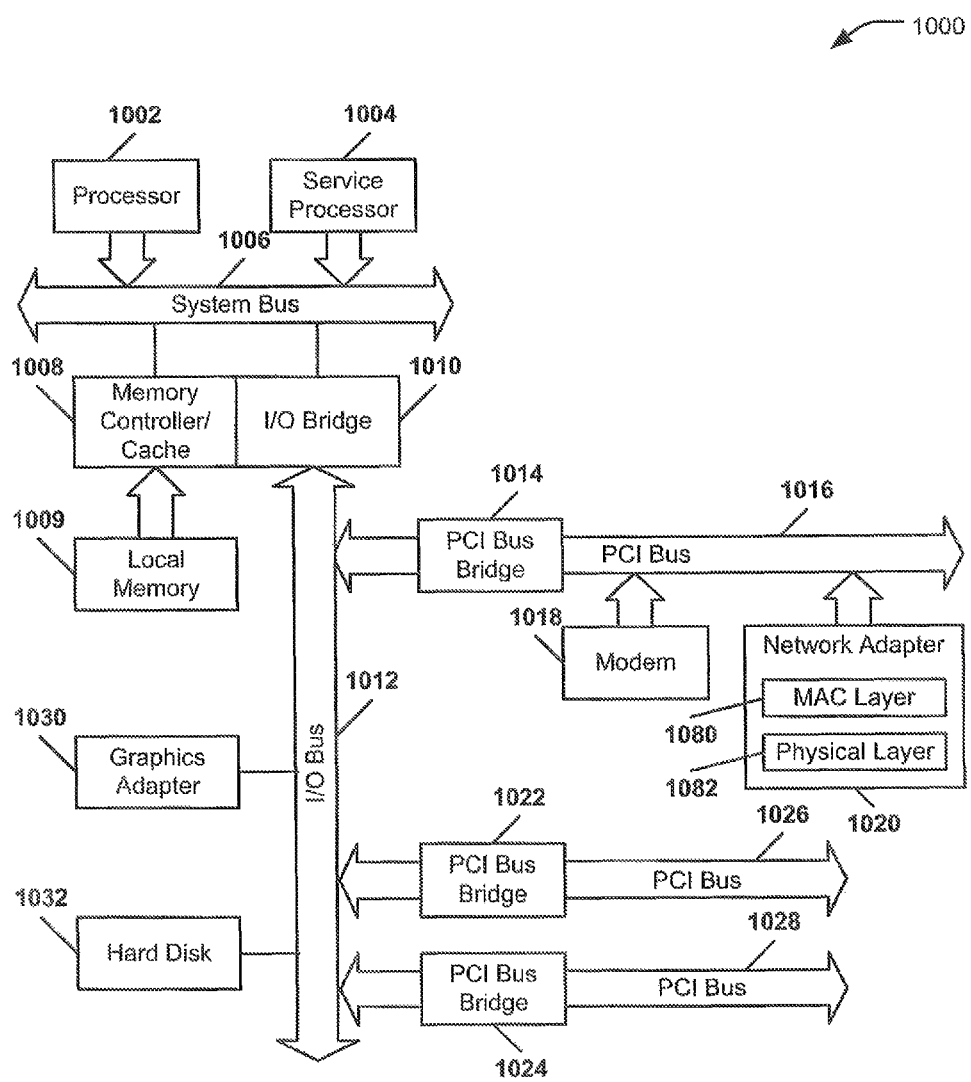
FIG. 10 is a block diagram of an illustrative embodiment of a general computer system.

Referring to FIG. 10, a block diagram of an illustrative embodiment of a general computer system is depicted and generally designated 1000. The data processing system 1000 may be a symmetric multiprocessor (SMP) system that includes a plurality of shared processors or SMT-capable processors, such as processors 1002 and 1004 connected to system bus 1006. Alternatively, a single processor system may be employed. In the depicted example, processor 1004 may be a service processor. Each SMT-capable processor may be capable of concurrently executing multiple hardware threads on the one processor.

Connected to system bus 1006 may be memory controller/cache 1008, which provides an interface to local memory 1009. An I/O bus bridge 1010 may be connected to a system bus 1006 to provide an interface to I/O bus 1012. A memory controller/cache 1008 and an I/O bus bridge 1010 may be integrated as depicted.

A peripheral component interconnect (PCI) bus bridge 1014 connected to I/O bus 1012 may provide an interface to PCI local bus 1016. In FIG. 10, the term PCI in this application may also refer to variations and extensions of PCI, such as PCI express (PCIe). Multiple modems may be connected to PCI bus 1016. Typical PCI bus implementations may support PCI expansion slots or add-in connectors. Communications links to network computers may be provided via modem 1018 and network adapter 1020 connected to PCI local bus 1016 through add-in boards.

Network adapter 1020 may include a physical layer 1082 which enables analog signals to go out to a network, such as for example, an Ethernet network via an R45 connector. A media access controller (MAC) 1080 may be included within network adapter 1020. Media access controller (MAC) 1080 may be coupled to bus 1016 and processes digital network signals. MAC 1080 may serve as an interface between bus 1016 and physical layer 1082. MAC 1080 may perform a number of functions involved in the transmission and reception of data packets. For example, during the transmission of data, MAC 1080 may assemble the data to be transmitted into a packet that includes address and error detection fields. During the reception of a packet, MAC 1080 may disassemble the packet and perform address checking and error detection. In addition, MAC 1080 may perform encoding/decoding of digital signals prior to transmission, perform preamble generation/removal, and bit transmission/reception.

Additional PCI bus bridges 1022 and 1024 may provide interfaces for additional PCI buses 1026 and 1028, from which additional modems or network adapters may be supported. In this manner, data processing system 1000 may allow connections to multiple network computers. A memory-mapped graphics adapter 1030 and hard disk 1032 may be directly or indirectly connected to I/O bus 1012.

Service processor 1004 may interrogate system processors, memory components, and I/O bridges to generate and inventory the system 1000. Service processor 1004 may execute Built-In-Self-Tests (BISTs), Basic Assurance Tests (BATs), and memory tests on one or more of the elements in the system 1000. Any error information for failures detected during the BISTs, BATs, and memory tests may be gathered and reported by service processor 1004.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain or store the program for use by or in connection with the instruction execution system, apparatus, or device.

In various embodiments, the medium may include a magnetic, electromagnetic, or semiconductor system (or apparatus or device) Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments, including embodiments of I/O adapters virtualized in multi-root input/output virtualization (MR-IOV) embodiments, or virtualized using software virtualization intermediaries, will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A computer implemented method, comprising:
receiving, by a high level access mechanism, a request to access a configuration space that is associated with a virtual function, the request including a configuration space address and a root complex identifier;
identifying, by the high level access mechanism, a first root complex of a plurality of root complexes based on the root complex identifier;
selecting, by the high level access mechanism, a slot that is associated with the first root complex, the slot capable of coupling a hardware input/output adapter to the first root complex;
determining, by the high level access mechanism, whether the configuration space address is associated with the selected slot; and
accessing, by the high level access mechanism, the configuration space using a low level access mechanism in response to determining that the configuration space address is associated with the selected slot.

2. The computer implemented method of claim 1, wherein the configuration space includes a read-only portion and a read-write portion.

3. The computer implemented method of claim 2, further comprising reading a vendor identifier of the virtual function from the read-only portion of the configuration space via the low level access mechanism.

4. The computer implemented method of claim 2, further comprising reading a device identifier of the virtual function from the read-only portion of the configuration space via the low level access mechanism.

5. The computer implemented method of claim 2, further comprising writing data to a register of the virtual function in the read-write portion via the low level access mechanism.

6. The computer implemented method of claim 1, wherein the low level access mechanism is at least one of an adapter specific access mechanism provided by the hardware input/output adapter, an access mechanism provided by the first root complex, or a peripheral component interconnect express (PCI-e) compliant access mechanism.

7. The computer implemented method of claim 1, further comprising:
determining, by the high level access mechanism, that the request includes instructions to retrieve at least one of device identifier or a vendor identifier of the virtual function;
retrieving, by the high level access mechanism, at least one of the device identifier or the vendor identifier from a table in a local memory instead of from the configuration space via the low level access mechanism; and
sending, by the high level access mechanism, at least one of the device identifier or the vendor identifier to a requestor of the request.

8. The computer implemented method of claim 7, wherein the request includes a token associated with the virtual function, further comprising using, by the high level access mechanism, the token associated with the virtual function to retrieve at least one of the device identifier or the vendor identifier from the table in the local memory.

9. The computer implemented method of claim 1, further comprising:
selecting, by the high level access mechanism, a next slot that is associated with the first root complex in response to determining that the configuration space address is unassociated with the selected slot;
determining, by the high level access mechanism, whether the configuration space address is associated with the next slot; and
accessing, by the high level access mechanism, the configuration space using the low level access mechanism in response to determining that the configuration space address is associated with the next slot.

10. An apparatus, comprising:
a processor;
a memory to store program code, the program code executable by the processor to receive, by a high level access mechanism, a request to access a configuration space that is associated with a virtual function, the request including a configuration space address and a root complex identifier, to identify, by the high level access mechanism, a first root complex of a plurality of root complexes based on the root complex identifier, to select, by the high level access mechanism, a slot that is associated with the first root complex, the slot capable of coupling a hardware input/output adapter to the first root complex, to determine, by the high level access mechanism, whether the configuration space address is associated with the selected slot, and to access, by the high level access mechanism, the configuration space using a low level access mechanism in response to determining that the configuration space address is associated with the selected slot.

11. The apparatus of claim 10, wherein the apparatus comprises a single root input/output virtualized (SR-IOV) adapter.

12. The apparatus of claim 10, wherein the program code is further executable by the processor to read at least one of a vendor identifier of the virtual function or a device identifier of the virtual function from the read-only portion of the configuration space via the low level access mechanism.

13. The apparatus of claim 10, wherein the program code is further executable by the processor to write data to the read-write portion via the low level access mechanism.

14. The apparatus of claim 10, wherein the program code is further executable by the processor to select, by the high level access mechanism, a next slot that is associated with the root complex and to access, by the high level access mechanism, the configuration space using the low level access mechanism in response to determining that the configuration space address is associated with the next slot.

15. The apparatus of claim 10, wherein the program code is further executable by the processor to determine, by the high level access mechanism, that the request includes instructions to retrieve at least one of a device identifier of the virtual function or a vendor identifier of the virtual function, to retrieve, by the high level access mechanism, at least one of the device identifier or the vendor identifier from a local table instead of from the configuration space via the low level access mechanism, and to send, by the high level access mechanism, at least one of the device identifier or the vendor identifier to a requestor of the request.

16. A computer program product comprising a non-transitory computer storage medium having computer program code embodied therewith, the computer program code executable by a processor to:
   receive a configuration request to provision a virtual function of a hardware input/output adapter that is capable of hosting multiple virtual functions;
   provision the virtual function at the hardware input/output adapter;
   create an entry in a table for the provisioned virtual function, the table stored in a local memory accessible by a high level access mechanism, wherein creating the entry in the table for the provisioned virtual function includes:
      identifying a configuration space address of a configuration space that is associated with the provisioned virtual function;
      storing a device identifier of the provisioned virtual function with the identified configuration space address of the provisioned virtual function in the entry in the table for the provisioned virtual function, wherein the device identifier is determined from the configuration space that is associated with the provisioned virtual function; and
      storing a vendor identifier of the provisioned virtual function with the identified configuration space address of the provisioned virtual function in the entry in the table for the provisioned virtual function, wherein the vendor identifier is determined from the configuration space that is associated with the provisioned virtual function; and
   send a response to the configuration request, the response including the identified configuration space address that is associated with the provisioned virtual function.

17. The computer program product of claim 16, wherein the configuration space that is associated with the provisioned virtual function comprises a first portion that is read-only and a second portion that is read-write.

18. The computer program product of claim 17, wherein the first portion of the configuration space includes the device identifier and the vendor identifier, and wherein the second portion includes at least one register.

19. The computer program product of claim 16, wherein the computer program code is further executable by the processor to:
   receive, by the high level access mechanism, a request to access the configuration space that is associated with the provisioned virtual function;
   determine, by the high level access mechanism, whether requested data is available in the local memory;
   retrieve, by the high level access mechanism, the requested data from the entry in the table for the provisioned virtual function in the local memory in response to determining that the requested data is available in the local memory; and
   send, by the high level access mechanism, the requested data to a requestor of the request.

20. The computer program product of claim 16, wherein the computer program code is further executable by the processor to:
   receive, by the high level access mechanism, a request to access the configuration space that is associated with the provisioned virtual function; and
   use, by the high level access mechanism, a low level access mechanism to access the configuration space that is associated with the provisioned virtual function instead of using the entry in the table for the provisioned virtual function in the local memory, wherein the low level access mechanism is at least one of an adapter specific access mechanism, an access mechanism provided by a root complex, or a peripheral component interconnect express (PCI-e) compliant access mechanism.

* * * * *